UNITED STATES PATENT OFFICE.

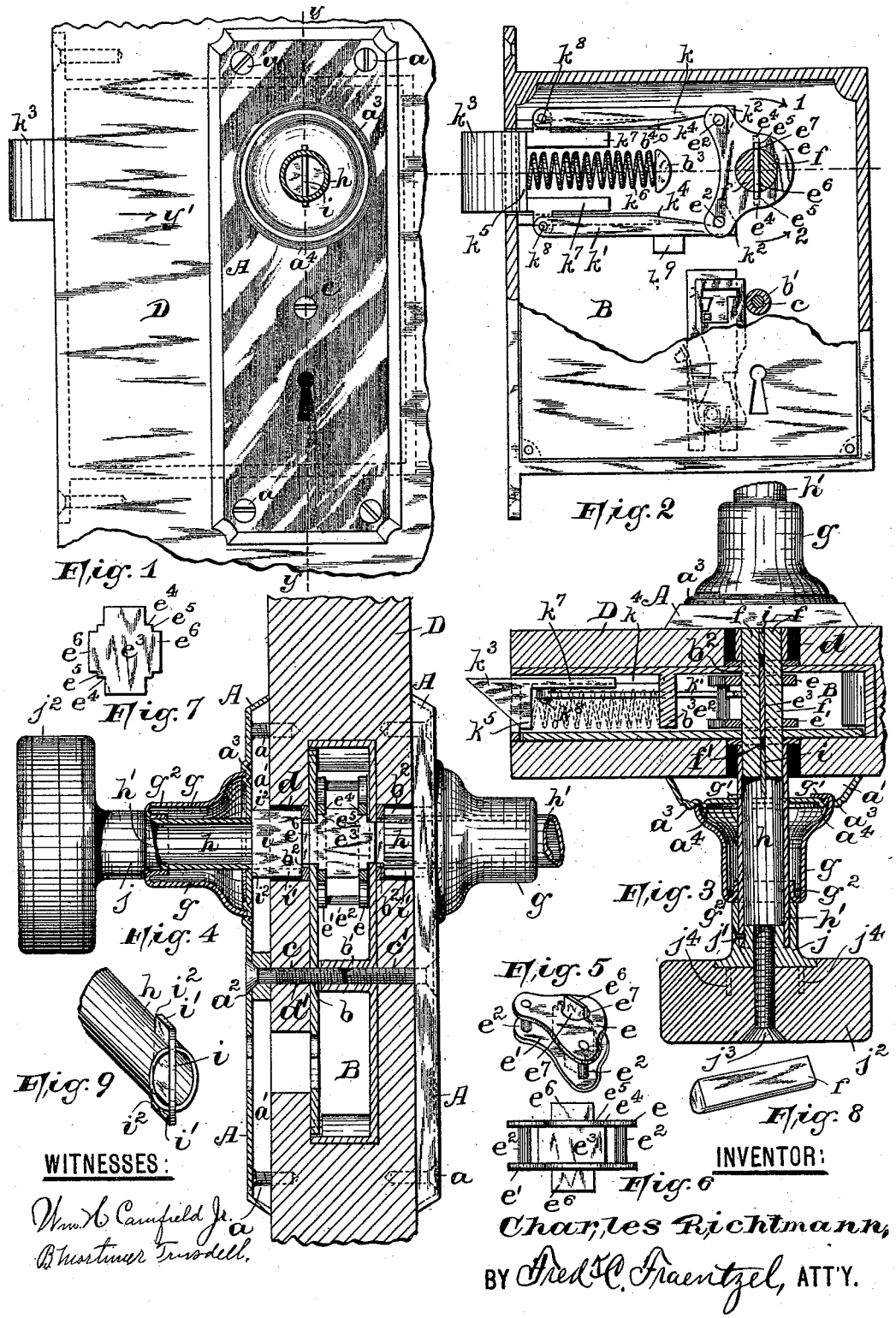

CHARLES RICHTMANN, OF NEWARK, NEW JERSEY.

LOCK.

SPECIFICATION forming part of Letters Patent No. 478,239, dated July 5, 1892.

Application filed March 5, 1892. Serial No. 423,874. (No model.)

*To all whom it may concern:*

Be it known that I, CHARLES RICHTMANN, a citizen of the United States, residing at Newark, in the county of Essex and State of New Jersey, have invented certain new and useful Improvements in Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in locks, and more generally to improvements in the manner of securing the spindle within the lock-case and connecting it to the operating mechanism; and it has for its main object to provide a cylindrical spindle and means for securing the knobs in position on the door in such a manner that they will not become loose and shake in their bearings and the spindle cannot become disengaged from the locking mechanism.

The invention has for a further object to provide a lock having a cylindrical spindle, either solid or tubular, adapted to engage with mechanism for operating the bolt, and the spindle extending through a sheet-metal cup arranged on the outside of the escutcheon or door-plates, thereby preventing the shaking of the spindle when in position, owing to the spindle being cylindrical and perfectly fitting in the bearings formed by the escutcheon-plate and the sheet-metal cup, whereby a cheaper and more simple construction is the result, and which is also more ornamental in its outward appearance.

My invention further consists of certain other arrangements and combinations of parts, such as will be hereinafter more fully described, and finally embodied in the clauses of the claim.

In the drawings herewith accompanying, Figure 1 is a representation of those parts of a door-lock to which my improvements are applied, clearly illustrating the arrangement of the door-plate, the cup which serves as a bearing for the spindle not being shown in this view, and the cylindrical spindle, which in this instance is tubular, being represented in cross-section. Fig. 2 is a part section and elevation of the lock-casing adapted to be mortised in the door to clearly illustrate one arrangement of the bolt-operating mechanism, and also devices with which the ends of the cylindrical spindles employed engage in order to operate said bolt-operating mechanism. Fig. 3 is a section taken on line $x$ in Fig. 2, looking downward and clearly illustrating the construction and arrangement of the working parts of the lock within the lock-casing and the manner of securing the cylindrical spindle within its bearings and the engaging devices for operating the bolt-operating mechanism. Fig. 4 is a vertical section taken on line $y$ in Fig. 1, looking in the direction of arrow $y'$. Fig. 5 is a perspective and Fig. 6 a side view of devices used in connection with my improved lock adapted to be operated by its spindles. Fig. 7 is a plan view of a plate employed in connection with the parts illustrated in said Figs. 5 and 6. Fig. 8 is a perspective view of a half-cylindrical block or plug used with the parts shown in said Figs. 5, 6, and 7, and Fig. 9 is the perspective view of one end of the spindle.

As has been stated, the essential feature of my invention is to provide perfectly-fitting bearings for the spindles, and also to avoid the employment of a screw for securing the knob to its spindle. In my construction the loosening or shaking of the spindle is prevented and the several parts of the lock are securely connected together.

In the drawings, A are the door-plates, of which there may be two, and these are secured by means of screws $a$ on the opposite sides of the door. Said door-plates may be cast; but for the sake of cheapness of construction they are preferably struck up from sheet metal, each forming a chamber $a'$, as will be seen from Figs. 3 and 4. In order to readily secure these door-plates in their respective positions on the opposite sides of the door, they are each provided with a hole $a^2$, and the locking-casing B, which may be of any well-known construction, is provided with a hole $b$ and a boss $b'$, having a screw-threaded hole for the reception of screws $c$ and $c'$, as will be clearly seen from Fig. 4. This enables the workman to readily secure the parts of the lock in position on the door, for all that he has to do after the mortise for the reception of the lock-casing has been formed is to drill a hole $d$ in the door D for the position of the spindle, and then to drill a second hole $d'$ entirely through the door at the proper distance from the center of the hole $d$, whereby the plates A can be properly and firmly secured by means of the screws $c$ and $c'$ in their positions on the opposite sides of the door, and the spindles which are arranged on and turn in bearings in said plates A are in their true positions with relation to the operating mechanism and will not bind.

As will be seen more especially from Fig. 4, in the opposite sides of the lock-casing B are formed the holes $b^2$, which correspond with the holes $d$ in the door. Within said lock-casing I arrange two plates $e$ and $e'$, of any desirable shape, which are secured together by means of pins $e^2$, and between said plates is arranged a flat plate $e^3$, provided with offsets $e^4$ and $e^5$, and also oppositely-arranged tongue portions $e^6$. Said offsets $e^4$ of the plate $e^3$ engage with the inner surfaces of the plates $e$ and $e'$, and the offsets $e^5$ are firmly wedged in the openings $e^7$ in said plates, whereby the flat and narrow tongue portions $e^6$ project through said openings and extend out on opposite sides of said plates $e$ and $e'$, as will be evident from Figs. 5 and 6. These plates $e$ and $e'$, which are firmly secured together in this manner, are placed between the sides of the lock-casing B, so that the tongue portions extend into the oppositely-arranged holes $b^2$, are centrally arranged therein, and are capable of a free reciprocatory movement in said bearings. Said tongue-pieces $e^6$ do not project beyond the outer edges of the lock-casing, as will be seen from Fig. 4, in order to enable the inserting of said casing in the mortise in the door. By this arrangement of the flat plate $e^3$ between the two plates $e$ and $e'$ and the offsets $e^5$, firmly secured in the openings $e^7$ in said plates, semicircular openings are the result on opposite sides of the plate $e^3$, and when the bolt or lock-casing B has been secured in the mortise in the door I slide one or two semi-cylindrical blocks $f$ into said semicircular openings, as will be clearly seen from Figs. 2 and 3. These blocks are of greater length than the greatest distance between the edges of the tongue-pieces $e^6$ on the plate $e^3$, and consequently project into the holes $d$ in the door on opposite sides of the bolt-casing B, so as to leave a narrow space $f'$ between the flat sides of the projecting ends of said blocks.

As has been stated in the above, the door-plates A are preferably struck up from sheet metal, and each may be provided with concentrically-arranged beads $a^3$ and $a^4$, between which is forced the base of an ornamental cup $g$, preferably of sheet metal, which can be soldered or brazed fast between said beads, or said cups may be provided with small tongues $g'$, (see Fig. 3,) which are passed through perforations in the plates A and are bent over on the inner sides of said plates, as shown. The upper and opposite ends of said cups $g$ are preferably bent inward to form bearings $g^2$ for the cylindrical spindles. Each spindle $h$, which may be solid or tubular, is slotted at one end, and is provided with a flat plate $i$, which is firmly held in said slotted end of the spindle, and has two oppositely-extending grip portions $i'$ projecting from opposite sides of said slotted end of each spindle. The free end of each spindle is then passed through the hole $a^2$ in the respective plates A until the edges $i^2$ of said grip portions $i'$ abut against the inner surfaces of said plates A, and the opposite end $h'$ of each spindle projects from the free end of its cup $g$, forming the bearings for the spindles. Upon said free ends of the spindles I arrange a rosette or sleeve $j$, which may be soldered thereto or secured thereto by means of a screw or pin $j'$, and upon each sleeve or collar are arranged in any well-known manner the knobs $j^2$. These knobs may be secured to said sleeves or collars by means of a screw $j^3$, if desirable, which is screwed into a threaded hole in the collar, small pins $j^4$ projecting into each knob, as indicated by dotted lines in Fig. 3, which serve to prevent the turning and becoming loose of the knob on its spindle. As will be seen from Figs. 3 and 4, when the knobs and collars or sleeves $j$ have been arranged and secured on each end of the spindles $h$ said spindles are firmly held in the bearings in each cup $g$ and the bearings formed by the holes $a^2$ in each plate A, the collars or sleeves $j$ and the plates $i$ preventing any possible longitudinal movement of either spindle or the withdrawal of the same. The several parts of the lock can now be arranged on the door and combined to form a complete working lock.

The locking-casing B and the several mechanisms connected therewith have been arranged in the mortise in the door and the semi-cylindrical blocks $f$ are inserted through either hole $d$ in the door, so as to be placed on opposite sides of the flat plate $e^3$ and to form the narrow spaces $f'$ between them. The door-plates A, with their spindles and knobs arranged and secured thereto in the manner just above described, are then placed on opposite sides of the door, so that the holes $a^2$ in each plate will correspond with the drilled hole $d'$ in the door, and the plates are secured in position by the screws $c$ and $c'$ and also by the screws $a$. The flat plates $i$ in each spindle will thus be forced into the spaces $f'$ between the opposite portions of the semi-cylindrical blocks $f$, and by turning either knob the spindle and its plate $i$ cause said blocks $f$ to press against the plate $e^3$, which thus turns on its tongue portions $e^6$ in the bearings or holes $b^2$ in the lock-casing B. The plates $e$ and $e'$ are thus caused to rotate in the direction of either arrow 1 or 2 in Fig. 2, according in which direction the knob is turned. The bolt and its intermediately-arranged connecting mechanism are operated by these plates. Thus when the plates $e$ and $e'$ move in either direction either of the pins $e^2$, to which are connected two links $k$ and $k'$, either by means of hooked ends $k^2$ or in any other well-known manner, pulls on one link, as $k$, and disengages the other link, as $k'$, thereby pulling or sliding back the tongue or bolt $k^3$ of the lock in its ways or guides $k^4$, as will be clearly evident from Figs. 2 and 3. Between the forward end of the bolt, as at $k^5$, and a post $b^3$ in the lock-casing is a spring $k^6$, which causes the normal return of all the several mechanisms when the door-knob has been released. The backward movement of the bolt $k^2$ is limited by a stop-pin $b^4$ in the lock-casing, with which one of the arms $k^7$ on the bolt comes in contact. Said links $k$ and $k'$ are pivotally connected with said arms $k^7$ by pivotal pins $k^8$, and one of said links, as $k^2$, may be provided with any form of suitable stop $k^9$, with which a locking mechanism operated by a key can be forced into holding engagement when desired to prevent the turning of the knob. In Fig. 2 I have illustrated one form of such locking mechanism; but I may use any other form of such locking mechanism, this construction of the lock not forming part of my invention.

It will be evident that I may make certain changes in the other parts of my construction of the lock forming the part of the invention, and I therefore do not wish to be understood as limiting myself to the exact forms of devices herein shown.

Having thus described my invention, what I claim is—

1. In a lock, the combination, with a bolt-operating mechanism, of a cylindrical spindle having slots in its end and a flat plate in said slots arranged to prevent the withdrawal of the spindle from the lock-casing, and devices in the lock-casing with which said plate in the slotted end of the spindle is in engagement, substantially as and for the purposes set forth.

2. In a door-lock, the combination, with a cylindrical spindle provided with a slotted end and a plate secured therein, of a bolt-operating mechanism consisting, essentially, of plates $e$ and $e'$ and a flat plate $e^3$, arranged therebetween, and blocks $f$, all arranged substantially as and for the purposes set forth.

3. In a door-lock, the combination, with a cylindrical spindle provided with a slotted end and a plate secured therein, of a bolt-operating mechanism consisting, essentially, of plates $e$ and $e'$ and a flat plate $e^3$, arranged therebetween, blocks $f$, said plates $e$ and $e'$ being connected by pins $e^2$, hook-shaped links engaging with said pins, and a spring-actuated bolt to which said links are pivotally connected, all arranged substantially as and for the purposes set forth.

4. In a lock, the combination, with mechanism adapted to operate the bolt-operating mechanism, of a cylindrical spindle provided with a knob, a face-plate A, and a cup $g$, of sheet metal, provided with a bearing $g^2$ for said spindle and said free end of the cup being in close engagement with a sleeve or collar on the knob, and a flat plate in the opposite end of the spindle adapted to engage with the inner surface of said face-plate and also with the mechanism for operating the bolt-operating mechanism, consisting, essentially, of plates $e$ and $e'$ and a flat plate $e^3$, arranged therebetween, and blocks $f$, between which said flat plate on the spindle projects, all arranged substantially as and for the purposes set forth.

5. The combination of the face-plate A, a cylindrical spindle, a flat plate $i$ on said spindle, a cup $g$, secured to said face-plate and arranged on said spindle between said plate and the knob on the spindle, a bolt-operating mechanism, and means connected with said bolt-operating mechanism and the plate on the spindle, all arranged substantially as and for the purposes set forth.

6. In a lock, the combination of a face-plate, a cup $g$, of sheet metal, on said plate, provided with a bearing $g^2$, and a cylindrical spindle arranged in said bearing $g^2$ and projecting into the face-plate, and means connected with said spindle for operating the bolt-operating mechanism of the lock, substantially as and for the purposes set forth.

7. In a lock, the herein-described plates $e$ and $e'$, provided with a plate $e^3$, having tongues $e^6$ for arranging them in bearings or openings in the sides of the lock-case, pins $e^2$, connecting said plates $e$ and $e'$ for operating the bolt-operating mechanism, a spindle, and means for operating said plates $e$ and $e'$ and $e^3$ when the spindle is turned, substantially as and for the purposes set forth.

8. In a lock, the combination, with the lock-case B, having openings or bearings $b^2$, of the plates $e$ and $e'$, and a plate $e^3$, arranged between said plates $e$ and $e'$, tongues $e^6$ on said plate $e^3$, projecting into said openings or bearings $b^2$, in which they rotate and hold the parts in position in the lock-case, blocks $f$, arranged on the sides of said plate $e^3$ and projecting from said hole $b^2$, thereby forming a space $f'$ between them, and a spindle engaging with the ends of said blocks, substantially as and for the purposes set forth.

9. In a lock, the combination, with the lock-case B, having openings or bearings $b^2$, of the plates $e$ and $e'$, and a plate $e^3$, arranged between said plates $e$ and $e'$, tongues $e^6$ on said plate $e^3$, projecting into said openings or bearings $b^2$, in which they rotate and hold the parts in position in the lock-case, blocks $f$, arranged at the sides of said plate $e^3$ and projecting from said opening $b^2$, thereby forming a space $f'$ between them, and a tubular spindle adapted to be passed over said projecting ends of the blocks $f$ and having a plate $i$, adapted to be passed between said blocks into the space $f'$ for operating said parts, substantially as and for the purposes set forth.

10. In a door-lock, the combination, with means for operating the bolt-operating mechanism, of blocks $f$, projecting from the lock-case, and a tubular spindle provided with a plate adapted to engage with said blocks, substantially as and for the purposes set forth.

11. In a lock, the combination, with a cylindrical spindle, of a sleeve or collar arranged on the free end of said spindle and a knob secured to said collar, a face-plate A, having an opening into which said spindle projects, and a cup of sheet metal arranged on said spindle between the face-plate and the collar or sleeve of the knob, substantially as and for the purposes set forth.

12. In a lock, a face-plate A, of sheet metal, having a bead $a^3$ therein, a sheet-metal cup arranged in said bead and provided with an inwardly-turned edge $g^2$, a cylindrical spindle provided with a collar, said collar projecting against said turned-over edge on said cap, and the inwardly-turned portion thereof serving as a bearing to said spindle, substantially as and for the purposes set forth.

13. In a lock, the combination, with a bolt-operating mechanism consisting, essentially, of a spring-actuated bolt and links $k$ and $k'$, pivotally connected with said bolt, provided with hook ends $k^2$, of a cylindrical spindle having slots in its end and a flat plate in said slots, arranged to prevent the withdrawal of the spindle from the lock-casing, and devices in the lock-casing with which said plate in the slotted end of the spindle and said hook ends $k^2$ are in engagement, substantially as and for the purposes set forth.

14. In a lock, the combination, with a bolt-operating mechanism consisting, essentially, of a spring-actuated bolt and links $k$ and $k'$, pivotally connected with said bolt, provided with hook ends $k^2$, of a cylindrical spindle having slots in its end and a flat plate in said slots, arranged to prevent the withdrawal of the spindle from the lock-casing, and devices in the lock-casing consisting of plates $e$ and $e'$, connecting-pins $e^2$, a plate $e^3$, and blocks $f$, with which said plate in the slotted end of the spindle and said hook ends $k^2$ are in engagement, substantially as and for the purposes set forth.

In testimony that I claim the invention set forth above I have hereunto set my hand this 2d day of March, 1892.

CHARLES RICHTMANN.

Witnesses:
FREDK. C. FRAENTZEL,
WM. H. CAMFIELD, Jr.